US007753086B2

(12) United States Patent
Dessen

(10) Patent No.: US 7,753,086 B2
(45) Date of Patent: Jul. 13, 2010

(54) METHOD FOR THE FILLING OF PARTICULATE MATERIAL IN VERTICAL TUBES

(75) Inventor: Erik Dessen, Oslo (NO)

(73) Assignee: Catalyst Services, Inc., Deer Park, TX (US)

( * ) Notice: Subject to any disclaimer, the term of this patent is extended or adjusted under 35 U.S.C. 154(b) by 746 days.

(21) Appl. No.: 11/578,173

(22) PCT Filed: Sep. 24, 2003

(86) PCT No.: PCT/NO03/00323

§ 371 (c)(1),
(2), (4) Date: Oct. 11, 2006

(87) PCT Pub. No.: WO2004/028679

PCT Pub. Date: Apr. 8, 2004

(65) Prior Publication Data

US 2007/0137146 A1    Jun. 21, 2007

(30) Foreign Application Priority Data

Sep. 27, 2002    (NO)    .................................. 20024628

(51) Int. Cl.
  B65B 1/04    (2006.01)
  B01J 8/06    (2006.01)
(52) U.S. Cl. ........................... 141/12; 141/73; 141/257; 141/260; 141/286; 422/219
(58) Field of Classification Search .................... 141/1, 141/2, 12, 71–74, 256–260, 286; 53/473, 53/475; 422/219
See application file for complete search history.

(56) References Cited

U.S. PATENT DOCUMENTS

| 1,802,089 | A | 4/1931 | Pfeiffer |
| 2,524,560 | A | 10/1950 | Cote |
| 4,077,530 | A | 3/1978 | Fukusen et al. |
| 4,176,997 | A | 12/1979 | Hungerbach |
| 4,321,738 | A | 3/1982 | Makhijani |

(Continued)

FOREIGN PATENT DOCUMENTS

EP    1 283 070 A2    2/2003

(Continued)

OTHER PUBLICATIONS

Mimmi Westman, International Search Report, Dec. 16, 2003, 2 pages, Swedish Patent Office, Stockholm Sweden.

(Continued)

*Primary Examiner*—Gregory L Huson
*Assistant Examiner*—Nicolas A Arnett
(74) *Attorney, Agent, or Firm*—Mark A. Oathout

(57) ABSTRACT

This invention relates to a method for filling particulate material in vertical tubes (1) where the velocity of fall of the material (4) is reduced by having it glide down a rotating spiral duct (2) or by gliding down a rotating inner tube (5) with openings above the bottom (6) through which the material can fall out. The inner tube (5) is filled with the particulate material (4). After the material has fallen out of the spiral duct (2) or the inner tube (5), it can fall towards the tube's (1) wall during the drop onto the top layer of filled material.

7 Claims, 2 Drawing Sheets

U.S. PATENT DOCUMENTS

| | | | |
|---|---|---|---|
| 4,433,707 A | | 2/1984 | Farnham |
| 4,883,363 A | | 11/1989 | Pillon et al. |
| 4,972,884 A | * | 11/1990 | Souers et al. ............. 141/1 |
| 5,082,414 A | | 1/1992 | Taupin |
| 5,113,918 A | | 5/1992 | McGregor |
| 5,147,612 A | | 9/1992 | Raal |
| 5,238,035 A | | 8/1993 | Poussin et al. |
| 5,247,970 A | | 9/1993 | Ryntveit et al. |
| 5,585,075 A | | 12/1996 | Takano et al. |
| 5,758,699 A | | 6/1998 | Haquet et al. |
| 5,906,229 A | | 5/1999 | Haquet et al. |
| 6,467,513 B1 | | 10/2002 | Yanaru et al. |
| 6,497,259 B1 | | 12/2002 | Wegman |
| 6,712,496 B2 | | 3/2004 | Kressin et al. |
| 6,781,024 B2 | * | 8/2004 | Butler et al. ............. 585/440 |
| 6,810,921 B2 | | 11/2004 | Schlosser |
| 6,817,389 B2 | | 11/2004 | Dovesi |
| 6,832,944 B2 | | 12/2004 | Ostrow |
| 2003/0031536 A1 | | 2/2003 | Boe et al. |
| 2004/0217039 A1 | | 11/2004 | Jardin et al. |
| 2004/0233775 A1 | | 11/2004 | van der Eerden et al. |
| 2007/0084519 A1 | * | 4/2007 | Brennom .................... 141/2 |

FOREIGN PATENT DOCUMENTS

| | | |
|---|---|---|
| EP | 1283070 | 2/2003 |
| EP | 1283070 A3 | 3/2003 |
| EP | 1348649 | 10/2003 |
| GB | 468721 | 7/1937 |
| JP | 61106401 | 5/1986 |
| JP | 10296073 | 11/1998 |
| WO | 2004096428 | 11/2004 |

OTHER PUBLICATIONS

Mimmi Westman, International Search Report, Dec. 16, 2003, 2pages, Swedish Patent Office, Sweden.

* cited by examiner

METHOD FOR THE FILLING OF PARTICULATE MATERIAL IN VERTICAL TUBES

This invention relates to a method for the filling of particulate material into vertical tubes where the particulate material is conveyed down in the tube via damper devices. By particulate material is meant particles having various geometric shapes such as spheres or cylinders, or other forms of packing material made of metal or ceramic material. The size of the material should be no more than ⅕ of the tube's diameter.

This method is of particular importance for the filling of catalyst for primary reforming of hydrocarbons by steam in a series of parallel reactor tubes. The height of these tubes is of about 10 m.

Pouring the particulate material into the tube from the top can lead to extensive crushing of the material, which in turn may lead to a non-homogeneous filling. Various methods for reducing the speed of the material are therefore used.

One method used is termed the sock method, where the particulate material is filled into a bag which is lowered into the tube and then opened. In this way the free fall of the material can be prevented. The disadvantage of this method is that many particles hit the top of the layer of material already filled at the same time. This may lead to the formation of bridges of material which prevents homogeneous flow of gas and leads as well to a lesser amount of filling of the catalyst in the tube. This is described by F. M. Nooy (Oil and Gas Journal, Nov. 12, 1984.) and confirmed experimentally by D. J. Humberland og C. S. Crawford (The packing of particles. Handbook of powder technology, Vol IV, Elsevier 1989). By making the tube vibrate, the bridges may be made to collapse, but the material may be crushed in the process.

Another damper method which has been used was to hang a rope with blades made of Teflon mounted on it, in accordance with U.S. Pat. No. 3,608,751. The inclination of the blades was 30-45 degrees to the rope and adjacent pairs of blades had an angle of 60 degrees to each other. The distance between the blades was 2.5 feet, the blades diameter is of about 3 inches, and the tube's inner diameter is 3-5 inches. Free fall from the top of the 34 foot high tube led to the crushing of 5% of the particles, whereas only 0.9% was crushed when this rope was used. No data is given which could be used for the calculation of the density of the filling, nor any information on whether or not vibration was used.

U.S. Pat. No. 4,077,530 describes a damping method where piano wire, shaped for example into a spiral, is made to hang down in the tube. The speed of the particles is reduced as a result of contact between the wire and the tube's inner wall. This method leads to a better packing than the sock method.

A damper device which has found favour in the industry in recent years, was developed and patented by Norsk Hydro ASA: U.S. Pat. No. 5,247,970. A series of damper brushes having a smaller diameter than the tube's inner diameter, are hung below one another inside the tube. The brushes consist of radially pointing steel springs which may be bent in all directions thus allowing particles, which fall down on the brush from above, to pass and thus reduce their speed. Like all the damper arrangements mentioned, these must be pulled up as the filling is in progress.

In addition to these methods, U.S. Pat. No. 2,524,560 describes an apparatus and a method for filling loose dry material tightly in a cylinder which is connected to a loading device and which also provides an arrangement for the removal of dust particles. The material is filled into a tube containing a centrally situated rotating feed screw running through the whole tube and down to the upper edge of the material in the cylinder which is to be filled. The cylinder is lowered as it is filled. However such a device will not be applicable for filling of catalyst particles in tubes about 10 m in height. It would be impossible to lower the tubes as they are filled. Furthermore, the feed screw may easily crush the catalyst particles.

The main object of this invention is to achieve a dense and homogeneous packing of material so that a stream of gas passing through the tube becomes as homogeneous as possible. This is hopefully achieved by distributing the material evenly across the tube's cross-section during the filling process.

Another object of this invention is to develop gentler methods for reducing the particle speed during the filling.

The above-mentioned devices for speed dampening have the disadvantage that damper devices placed in the centre of the tube being filled, impede an even distribution of material across the cross-section. The particulate material, which falls near the inner tube wall, may, in the worst case, get a minimal speed reduction compared with the material falling near the centre of the tube.

The following examples are included in order to elucidate the invention, but are not meant to limit the extent of it.

The invention is further explained in connection with the description of the figures.

Special features of the invention and its scope are defined in the attached claims.

The essential feature of the invention, in which particulate material is filled in vertical tubes, is that the material is conveyed down via a duct formed as a spiral, or down into an inner rotating tube giving it a horizontal velocity component thereby flinging the material towards the inner wall of the vertical tube before it hits the top layer of the already filled material.

A special feature of this invention is that the particulate material is conveyed down to a rotating duct formed as a spiral.

It may also be helpful to use a spiral-shaped duct, mounted under damper devices such as gratings and/or brushes, which could rotate separately or together with the damper devices.

The invention also includes the conveying of the particulate material down into an inner tube having a bottom with openings in the tube wall above the aforementioned bottom. The material will be flung out of the inner tube, towards the wall of the vertical tube during the fall towards the top layer of filled material.

Figure 1:
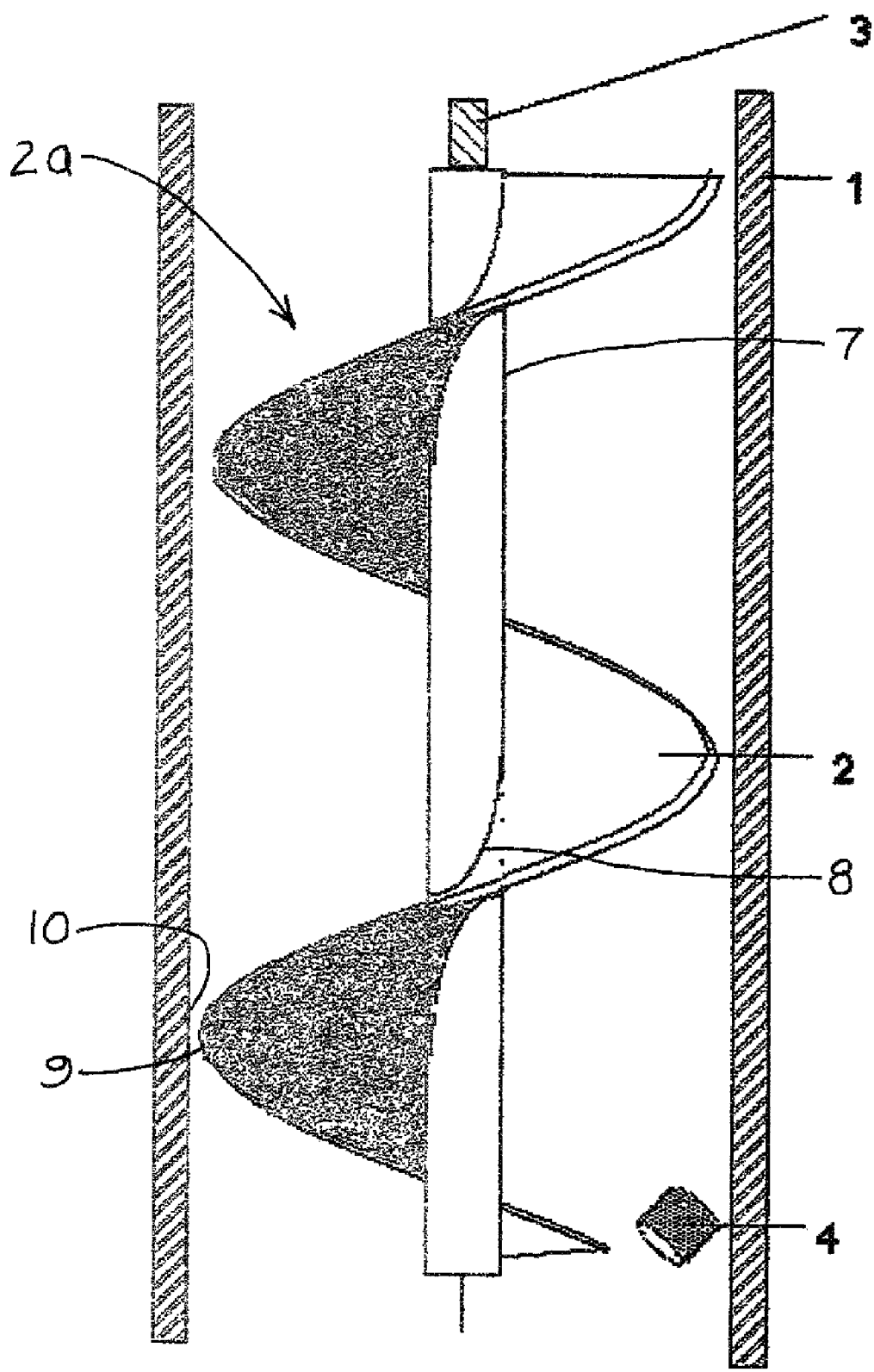
FIG. 1 shows a spiral-shaped device according to the present invention.

The device according to FIG. 1 shows a tube 1, for filling of particulate material 4. In the centre of the tube 1 is a duct shaped as a spiral 2 which may be rotating. It can be hung up under another breaking device or from a wire from the top of tube 1 by means of a fastening device 3. The particulate material 4 is flung towards tube's 1 inner wall during the fall. Damper device 2a which in the essential embodiment shown is a spiral 2 can be pulled up gradually as tube 1 is filled with material and its lower part will, during the filling, reach a little above the filled material. Spiral or spiral shaped duct 2 has a centrally located shaft 7. An inner edge 8 of the spiral shaped duct 2 is attached to the centrally located shaft 7, and an outer edge 9 of the spiral shaped duct 2 is adjacent an inner wall 10 of the tube 1.

The spiral-shaped device 2 may be combined to advantage with other damping devices in such a way that the spiral-shaped device 2 forms the lower part of the device while the damper devices mentioned above, form the upper part to which the particulate material is supplied.

Figure 2:
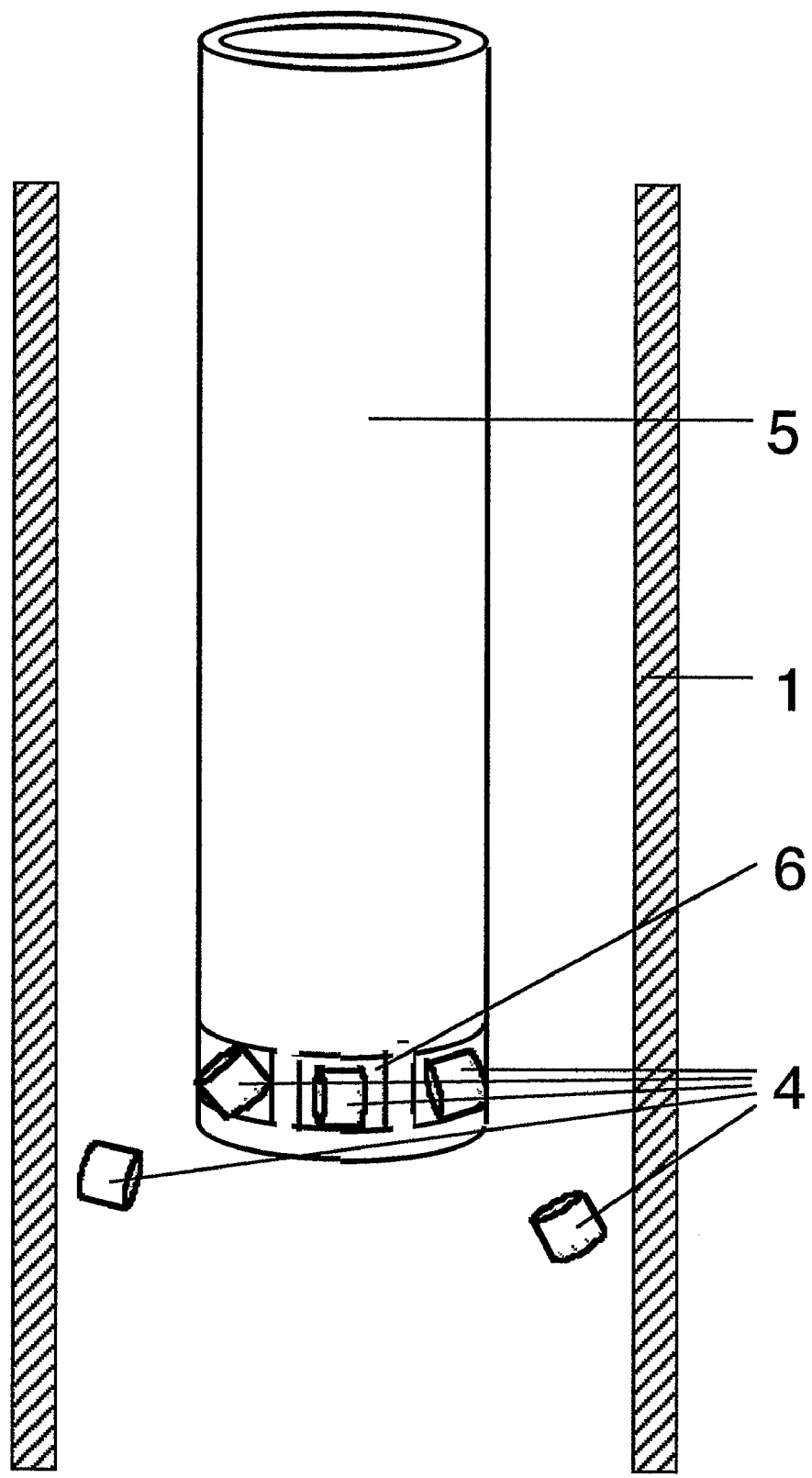
FIG. 2 shows a tube-shaped device according to the present invention.

FIG. 2 shows a vertical tube 5 filled with particles 4 which may rotate inside the tube 1, which is to be filled. The inner tube 5 has a bottom and openings in the tube wall 6 above the bottom so that the particles 4 may fall out of the tube and be flung towards the wall in tube 1 during the fall down towards the top layer of filled material.

During tests with the spiral shaped duct, it was discovered that the filling was very even and dense when the duct rotated slowly either in the same direction or in the opposite direction of the spiral's direction of twist. It was also observed that when the particulate material left the duct it had a horizontal velocity component in addition to the vertical component. When it hit the top layer, it may have a higher kinetic energy and thus may more easily find a stable position without forming a bridge.

It was therefore of interest to study how the energy the material had when it hit the top layer influences the filling. R. M. Nedderman (Granular materials, Cambridge University press 1992) has described an experiment where the void fraction was measured for fillings with free fall of various types of particles. The height of the free fall was increased from 0.05 to 2.4 m, and for cylindrical particles with height and diameter 6.35 mm the void fraction decreased from 0.38 to 0.33 respectively. This indicates that the particles' kinetic energy influences the packing of the particles.

The invention's object is the filling of particulate material, as mentioned in the introduction, into tubes in such a way that most of the material is given a horizontal velocity component just before it hits the top layer of already filled material. In principle this may probably be achieved by rotating the damper devices described earlier. However, better control, and therefore a more homogeneous filling, will be achieved with a combination of these damper devices and the spiral duct while a spiral duct is installed below the lowest damper. The shape of the spiral duct and the rotation speed has to be adjusted so that an optimal degree of filling and filling speed can be achieved.

EXAMPLE 1

The purpose of this experiment is to achieve the densest packing possible as a basis for further experiments.

The filling was performed in a transparent plastic tube having an inner diameter of 10 cm and a height of about 1 m. Cylindrical catalyst particles with outer and inner diameters of 1.7 and 0.6 cm, respectively, and 1.7 cm height were used. Photographs were taken during the filling with a Canon EOS 650 camera. The photographs were taken continuously, and the shutter speed was $1/90$-$1/125$ sec.

The experiment aims at finding the maximum degree of filling marked by the void fraction since this quantity is used in the literature when various filling methods are compared.

The particulate material was poured slowly into the tube while it was subjected to vibration. The height of the filled layer was then measured from the bottom of the tube to the bottom of a piston which was lowered down onto the material. The piston was a cylindrical plastic box which fit snugly in the tube. The volume of filled particulate material and the total outer volume of all the material were used to calculate the void fraction. This fraction varied from 0.36 to 0.38 in 3 experiments.

EXAMPLE 2

The purpose of this experiment was to show how the particulate material slides down a spiral duct and how it thereby achieves a horizontal velocity component as it is flung towards the inner wall of the tube just before it hits the top layer of filled catalyst.

The spiral duct was an extension of an ice drill of the same type as shown in FIG. 1. The duct rotated at a speed of 3 seconds per revolution in the same direction as the twist direction of the spiral. The distance from the bottom of the tube to the lower edge of the drill was 32 cm. In 3 experiments the void fraction varied is from 0.39 to 0.42, which indicates a low void fraction.

The invention claimed is:

1. A method for filling particulate material in a vertical tubes, in which the material is conveyed down via at least one damper device, comprising the steps of:

gradually pulling the damper device up from inside of the tube, wherein at least one of the at least one damper device is formed as a spiral shaped duct, as the tube is filled with the material so that a lowermost portion of the spiral shaped duct is spaced from the top layer of the filled material;

conveying the particulate material down the spiral shaped duct while the spiral shaped duct is rotating inside the tube, the spiral shaped duct having its outer perimeter adjacent an inner wall of the tube and its axis coaxial with a longitudinal axis of the tube; and flinging the material with a horizontal velocity component towards the inner wall of the tube before the material comes to rest on a top layer of filled material inside the tube.

2. The method according to claim 1, further including the step of adjusting the rotational speed of the spiral shaped duct.

3. A method for filling particulate material in a vertical tube, in which the material is conveyed down via at least one damper device, comprising the steps of:

gradually pulling the damper device up from inside of the tube, wherein at least one of the at least one damper device is formed as a spiral shaped duct, as the tube is filled with the material so that a lowermost portion of the spiral shaped duct is spaced from the top layer of the filled material;

conveying the particulate material down the spiral shaped duct while the spiral shaped duct is vibrating inside the tube, the spiral shaped duct having its outer perimeter adjacent an inner wall of the tube and its axis coaxial with a longitudinal axis of the tube; and flinging the material with a horizontal velocity component towards the inner wall of the tube before the material comes to rest on a top layer of filled material inside the tube.

4. An apparatus for filling a particulate material in a vertical tube in which the material is conveyed down via a damper device, comprising:

wherein the damper device comprises a spiral shaped duct;

wherein said spiral shaped duct is configured to be gradually pulled up from the inside of the tube as the tube is filled with the material;

wherein the lowermost portion of said spiral shaped duct is spaced from a top layer of the filled material;

wherein said spiral shaped duct is a rotating spiral shaped duct having a coaxially and centrally located shaft to which an inner edge of a spiral path of said spiral shaped duct is attached, and said spiral shaped duct having an outer edge adjacent an inner wall of the tube and an axis coaxial with a longitudinal axis of the tube; and wherein said rotating spiral shaped duct provides the material with a horizontal velocity component to fling the material towards the inner wall of the tube before the material comes to rest on the top layer of the filled material inside the tube.

5. The apparatus according to claim 4, wherein said spiral shaped duct forms a lower part of the damper device.

6. The apparatus according to claim 5, further comprising a fastening device located at a top of said spiral shaped duct.

7. The apparatus according to claim 4, further comprising a fastening device located at a top of said spiral shaped duct.

* * * * *